UNITED STATES PATENT OFFICE.

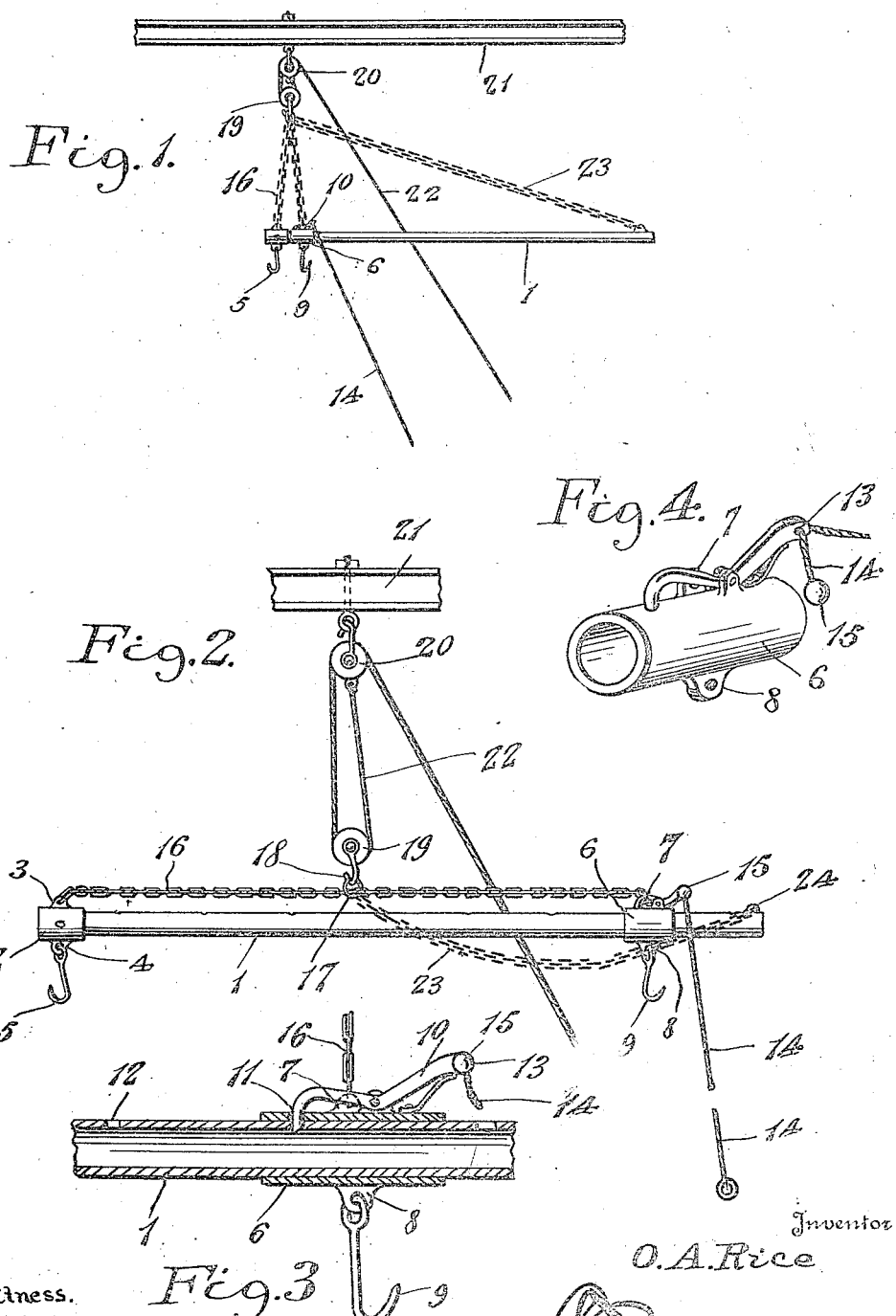

OLE A. RICE, OF ROSEAU, MINNESOTA.

GAMBREL.

1,194,235.

Specification of Letters Patent.

Patented Aug. 8, 1916.

Application filed March 28, 1915. Serial No. 87,357.

*To all whom it may concern:*

Be it known that I, OLE A. RICE, a citizen of the United States, residing at Roseau, in the county of Roseau and State of Minnesota, have invented certain new and useful Improvements in Gambrels; and I do hereby declare the following to be a full, clear, and exact description of the invention, such as will enable others skilled in the art to which it appertains to make and use the same.

This invention relates to a new and useful improvement in a gambrel and one of its objects is the provision of a device of this character which shall be simple, durable and efficient, and which may be manufactured and sold at a comparatively low cost.

Another object of this invention is to provide a horizontal rod, having means secured to one end and movable means secured to the opposite end for attaching cattle or other animals in a suspended position upon the rod, whereby the animals may be cut open to remove the entrails.

A further object of this invention is to provide a chain attached intermediate its ends to a block and tackle and its ends secured to the attaching means upon the ends of the rod for supporting the animal in a suspended position, whereby the animal may be raised and lowered.

A further object of this invention is to provide means for locking the movable attaching means at various points along the rod, whereby the device may be employed on animals of various sizes and which may be readily unlocked to slide the movable attaching means in the direction of the stationary means to bring the halves of an animal in close relation to each other after the animal has been cut in half.

A still further object of this invention is to provide means attached to one end of the rod and to the center of the chain for supporting one end of the rod when the movable attaching means has been brought in close relation to the stationary attaching means, whereby the rod will be supported in a horizontal position at all times.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a front elevation of a gambrel, constructed in accordance with my invention, Fig. 2 is a similar view partly in section, illustrating the device occupying a position for supporting an animal while being dressed, Fig. 3 is a detail sectional view of the movable attaching means, illustrating the means of locking it in various positions along the rod, and Fig. 4 is a perspective view of the movable attaching means removed from the rod.

Referring in detail to the drawing, the numeral 1 indicates a horizontal rod, having a collar 2 secured to one end thereof and has formed thereon ears 3 and 4. A suitable hook 5 is secured to the ear 4, for attaching one of the rear legs of an animal to the rod 1.

A collar 6 is slidably mounted on the rod 1 and is provided with ears 7 and 8. A hook 9 is secured to the ear 8 for attaching the other rear leg of the animal to the movable collar 6. Pivotally secured to the movable collar 6 is a spring pressed lever 10, having its end 11 bent downwardly to extend through an opening in the movable collar 6 and to be received in one of the openings 12 arranged along the rod 1, whereby the collar 6 may be locked and held against movement at various points along the rod. The lever 10 is provided with an aperture 13 to receive an operating cord 14, having a ball 15 secured to one end to prevent the cord from being withdrawn from an engagement with lever 10, when the cord is pulled to raise the end 11 of the lever 10 from an engagement with the opening 15 to slide the collar 6 along the rod 1.

A chain 16 is secured to the ears 3 and 7 and is provided with a ring 17 intermediate its ends for receiving a hook 18 carried by a pulley 19. A pulley 20 is secured to a beam 21 or other suitable support and has secured thereto a rope which passes through the pulley 18 and over the pulley 20 to provide a block and tackle, whereby the device may be raised and lowered.

Secured to the ring 17 is a chain 23 which is secured to the end of the rod 1 as illustrated at 24 for supporting the rod 1 in a horizontal position when the movable collar 6 is in a position as illustrated in Fig. 1, and which will be hereinafter more fully described.

In operation, the rear legs of an animal are secured to the hooks 5 and 9 and the collar 6 is then moved along the rod 1 by releasing the lever 10 from an engagement with the openings 12, until the rear quarters of the animal have been sufficiently spread. The animal is then cut down the center and the entrails are removed and later the animal is entirely cut in half. The halves of the animal will be suspended at a considerable distance apart and the collar 6 is then moved into close relation with the collar 2, bringing the halves in close relation, whereby they may be further dressed and cut into quarters. When the halves are in close relation with each other, the chain 23 will support the unloaded end of the rod 1 and hold it in a horizontal position.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A gambrel comprising a horizontal rod, a collar secured to one end of said rod, ears formed on said collar, a collar slidably mounted on said rod, ears formed on said slidably mounted collar, hooks secured to the ears of said collars, a chain secured to the ears of the collars, means attached to the chain for raising and lowering the device, means for locking the movable collar at various points along the rod, and means for supporting one end of the horizontal rod when the movable collar is in close relation to the first mentioned collar.

2. A gambrel comprising a horizontal rod, a collar secured to said rod, a movable collar on said rod, means for locking said movable collar against sliding movement on the rod, a chain attached to said collars, means attached to said chain for supporting the device, and a second chain connected to the first mentioned chain intermediate its ends and to one end of the rod for supporting the rod in a horizontal position when the movable collar has been moved against the first mentioned collar.

In testimony whereof I affix my signature in presence of two witnesses.

OLE A. RICE.

Witnesses:
 JOHN P. IVERS,
 A. O. HAGEN.